United States Patent
Battré et al.

(10) Patent No.: US 9,100,337 B1
(45) Date of Patent: Aug. 4, 2015

(54) ENABLING COOKIES FOR A WEBSITE

(71) Applicant: Google Inc., Mountain View, CA (US)

(72) Inventors: Dominic Pascal Battré, Munich (DE); Andrew Swerdlow, San Francisco, CA (US); Markus Heintz, Munich (DE)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 13/772,280

(22) Filed: Feb. 20, 2013

(51) Int. Cl.
| | |
|---|---|
| G06F 15/173 | (2006.01) |
| H04L 12/24 | (2006.01) |
| H04L 29/08 | (2006.01) |
| H04L 29/06 | (2006.01) |
| G06F 21/62 | (2013.01) |

(52) U.S. Cl.
CPC .............. *H04L 41/50* (2013.01); *H04L 67/22* (2013.01); *G06F 21/6263* (2013.01); *H04L 63/102* (2013.01)

(58) Field of Classification Search
CPC ..... H04L 67/02; H04L 12/2602; H04L 67/14; H04L 67/146; H04L 67/22; H04L 67/2814; H04L 63/102; H04L 21/6263; H04N 21/44222; H04N 21/6582; H04N 21/2407; H04N 21/252; H04N 21/254; H04N 21/25866; H04N 21/2665; H04N 21/6125; H04N 21/6175; H04N 21/812; H04N 21/84; G06F 17/30899; G06F 21/6263
USPC .................................. 709/224, 225; 715/745
See application file for complete search history.

(56) References Cited

U.S. PATENT DOCUMENTS

| | | | |
|---|---|---|---|
| 2012/0144016 A1* | 6/2012 | Zhang et al. ................... | 709/224 |
| 2012/0240050 A1* | 9/2012 | Goldfeder et al. ............. | 715/745 |
| 2012/0273338 A1* | 10/2012 | Falkenburg et al. ............ | 726/30 |
| 2012/0304286 A1* | 11/2012 | Croll et al. ...................... | 726/22 |
| 2012/0317271 A1* | 12/2012 | Funk et al. ..................... | 709/224 |
| 2013/0262653 A1* | 10/2013 | Qu et al. ........................ | 709/224 |
| 2014/0074888 A1* | 3/2014 | Potter et al. ................... | 707/779 |

* cited by examiner

*Primary Examiner* — Brian J Gillis
*Assistant Examiner* — Shean Tokuta
(74) *Attorney, Agent, or Firm* — McDermott Will & Emery LLP (57) ABSTRACT

A system and machine-implemented method for enabling cookies for a website. One or more domains are identified, each of which serve at least one cookie in association with user access to a website. For each of the one or more domains, a determination is made whether the domain serves the at least one cookie within a first-party context in which the domain hosts the website, or within a third-party context in which the domain does not host the website. A graphical representation of the one or more domains is provided based on the determination for each of the one or more domains. The graphical representation differentiates between the first-party context or the third-party context. An interface set for enabling or disabling the serving of the at least one cookie for each of the one or more domains is provided, in association with the graphical representation.

20 Claims, 6 Drawing Sheets

ENABLING COOKIES FOR A WEBSITE

BACKGROUND

The present disclosure generally relates to web cookies and, in particular, to enabling cookies for a website.

A cookie is a small piece of data sent from a website and stored in a user's web browser while a user is browsing a website. When the user browses the same website in the future, the data stored in the cookie can be retrieved by the website to notify the website of the user's previous activity. Users may wish to be provided with notice and consent for cookies. However, this task can become difficult, especially when users use multiple devices and different browsers to access web content.

SUMMARY

The disclosed subject matter relates to a machine-implemented method of enabling cookies for a website. The method comprises identifying one or more domains, each of which serve at least one cookie in association with user access to a website, and determining, for each of the one or more domains, whether the domain serves the at least one cookie within a first-party context in which the domain hosts the website, or within a third-party context in which the domain does not host the website. The method further comprises providing for a graphical representation of the one or more domains based on the determination for each of the one or more domains, wherein the graphical representation differentiates between the first-party context or the third-party context, and providing, in association with the graphical representation, an interface set for enabling or disabling the serving of the at least one cookie for each of the one or more domains.

The disclosed subject matter further relates to a system for enabling cookies for a website. The system comprises one or more processors, and a machine-readable medium comprising instructions stored therein, which when executed by the processors, cause the processors to perform operations comprising identifying one or more domains, each of which serve at least one cookie in association with user access to a website, wherein each of the one or more domains serve the at least one cookie by at least one of submitting a prior cookie or storing a new cookie. The operations further comprise determining, for each of the one or more domains, whether the domain serves the at least one cookie within a first-party context in which the domain hosts the website, or within a third-party context in which the domain does not host the website, and providing for a graphical representation of the one or more domains based on the determination for each of the one or more domains, wherein the graphical representation differentiates between the first-party context or the third-party context. In addition, the operations comprise providing, in association with the graphical representation, an interface set for enabling or disabling the serving of the at least one cookie for each of the one or more domains.

The disclosed subject matter also relates to a machine-readable medium comprising instructions stored therein, which when executed by a system, cause the system to perform operations comprising determining that a first domain serves at least one cookie in association with user access to a website, within a first-party context in which the first domain hosts the website. The operations further comprise determining that a second domain serves at least one cookie in association with user access to the website, within a third-party context in which the second domain does not host the website, and providing for a graphical representation of the first and second domains, wherein the graphical representation indicates the first-party context for the first domain and indicates the third-party context for the second domain. In addition, the operations comprise providing, in association with the graphical representation, an interface set for enabling or disabling the serving of the at least one cookie for each of the first and second domains.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, users may wish to be provided with notice and consent for cookies. However, this task can become difficult, especially when users use multiple devices and different browsers to access web content.

The subject disclosure provides for enabling cookies for a website. One or more domains are identified, each of which serve at least one cookie in association with user access to a website. For each of the one or more domains, a determination is made whether the domain serves the at least one cookie within a first-party context in which the domain hosts the website, or within a third-party context in which the domain does not host the website. A graphical representation of the one or more domains is provided based on the determination for each of the one or more domains. The graphical representation differentiates between the first-party context or the third-party context. An interface set for enabling or disabling the serving of the at least one cookie for each of the one or more domains is provided, in association with the graphical representation.

Figure 1:
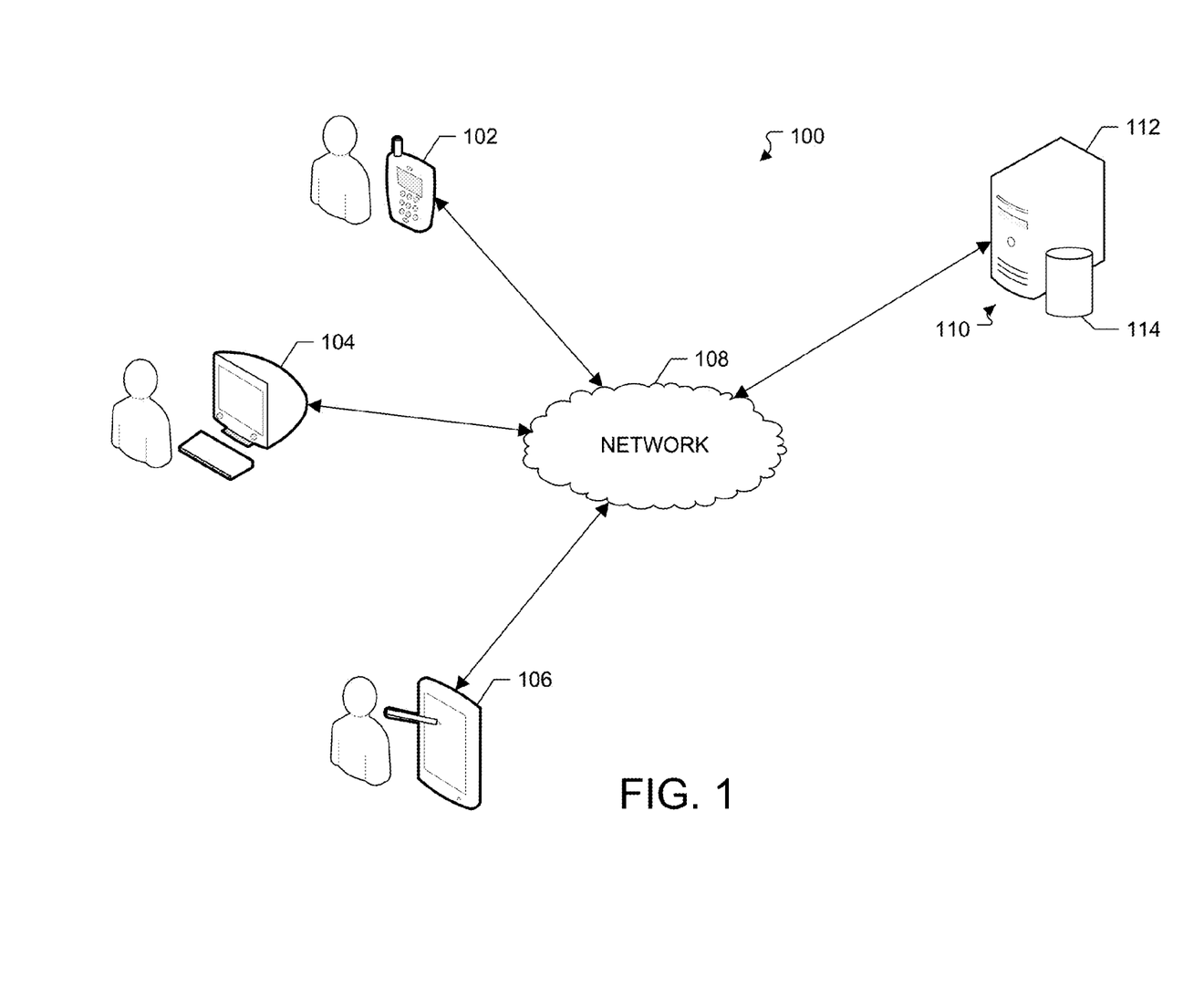
FIG. 1 illustrates an example network environment which can provide for enabling cookies for a website.

FIG. 1 illustrates an example network environment which can provide for enabling cookies for a website. A network environment 100 includes computing devices 102, 104 and 106 and computing system 110. Computing devices 102-106 and computing system 110 can communicate with each other through a network 108. Computing system 110 can include one or more computing devices 112 (e.g., one or more servers), respectively, and one or more computer-readable storage devices 114 (e.g., one or more databases), respectively.

Each of computing devices 102-106 can represent various forms of processing devices. Example processing devices include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, any of computing devices 102-106 can provide for enabling cookies for a website (e.g., hosted by server 110). The computing device identifies one or more domains (e.g., corresponding to server 110 and additional servers), each of which serve at least one cookie in association with user access to the website. The computing device 102-106 determines, for each of the one or more domains, whether the domain serves the at least one cookie within a first-party context in which the domain hosts the website, or within a third-party context in which the domain does not host the website. The computing device 102-106 provides for a graphical representation of the one or more domains based on the determination for each of the one or more domains, wherein the graphical representation differentiates between the first-party context or the third-party context. The computing device 102-106 provides, in association with the graphical representation, an interface set for enabling or disabling the serving of the at least one cookie for each of the one or more domains.

Figure 2:
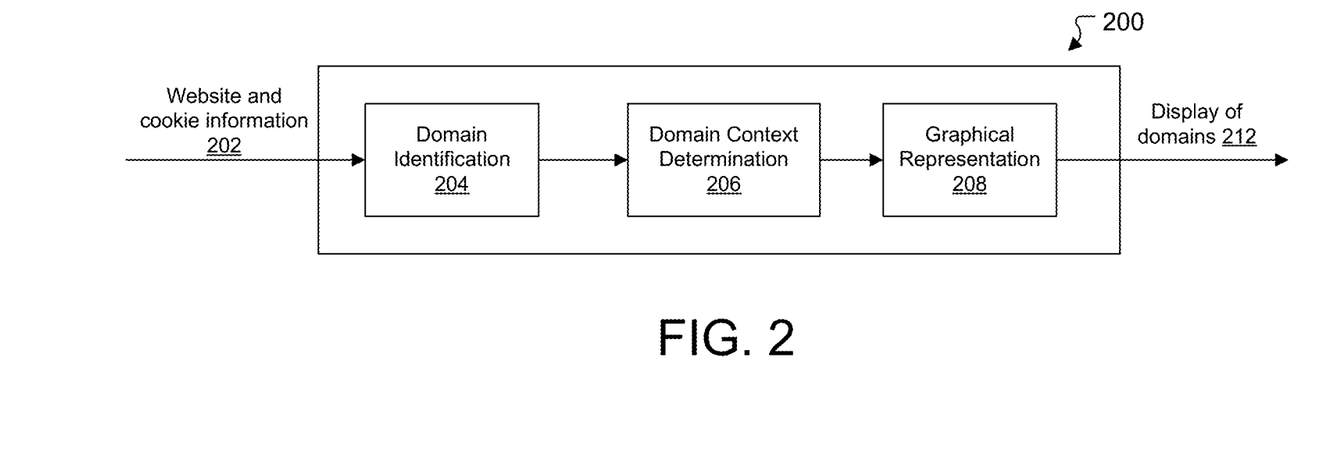
FIG. 2 is a block diagram illustrating example components of a system for enabling cookies for a website.

FIG. 2 is a block diagram illustrating example components of a system for enabling cookies for a website. System 200 includes a domain identification component 204, a domain context determination component 206, and a graphical representation component 208. System 200 can receive website and cookie information 202 as input, and can provide a display 212 of domains serving cookies as output (e.g., with interfaces for enabling and disabling cookies for the domains).

Website and cookie information 202 can correspond to the identity of a website being accessed, and a list of cookies which are served (e.g., submitted or stored) in association with the website. The cookies can correspond to a user accessing web content (e.g., based on a user profile of the user). Alternatively, or in addition, the cookies can correspond to a computing device accessing the website.

Domain identification module 204 receives the website and cookie information 202, and identifies the domain(s) which serve at least one cookie in association with access to the website. In example aspects, each of the cookies (e.g., identified by website and cookie information 202) have several attributes, with one of the attributes being the identification of the domain from which the cookie is served. Domain identification module 204 can access this attribute from the cookies provided in website and cookie information 202, to identify the domain(s) which serve the cookies.

The domains identified by domain identification module 204 can either be first-party domains or third-party domains. As used herein, a "first-party" domain corresponds to the domain hosting the website being accessed. On the other hand, a "third-party" domain corresponds to a domain other than the domain hosting the website. Domain context determination module 206 determines, for each of the domain(s) identified by domain identification module 204, whether the domain corresponds to a first-party domain or a third-party domain. As such, domain identification module 204 determines, for each of the one or more domains, whether the domain serves the at least one cookie within a first-party context in which the domain hosts the website, or within a third-party context in which the domain does not host the website.

Figure 3:
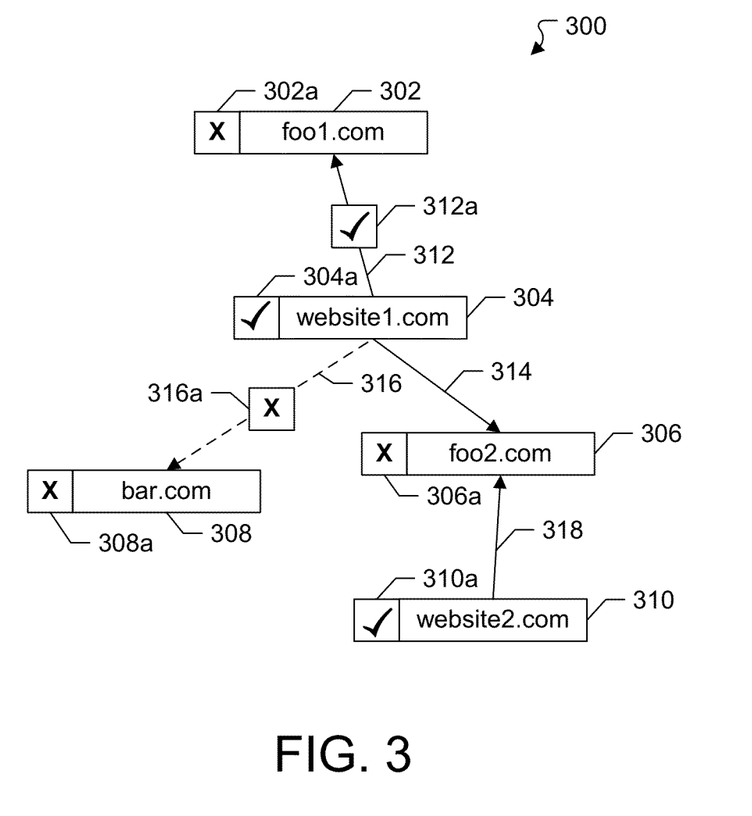
FIG. 3 illustrates an example of a graphical interface which differentiates display between domains serving cookies in a first-party context or a third-party context.
Figure 4:
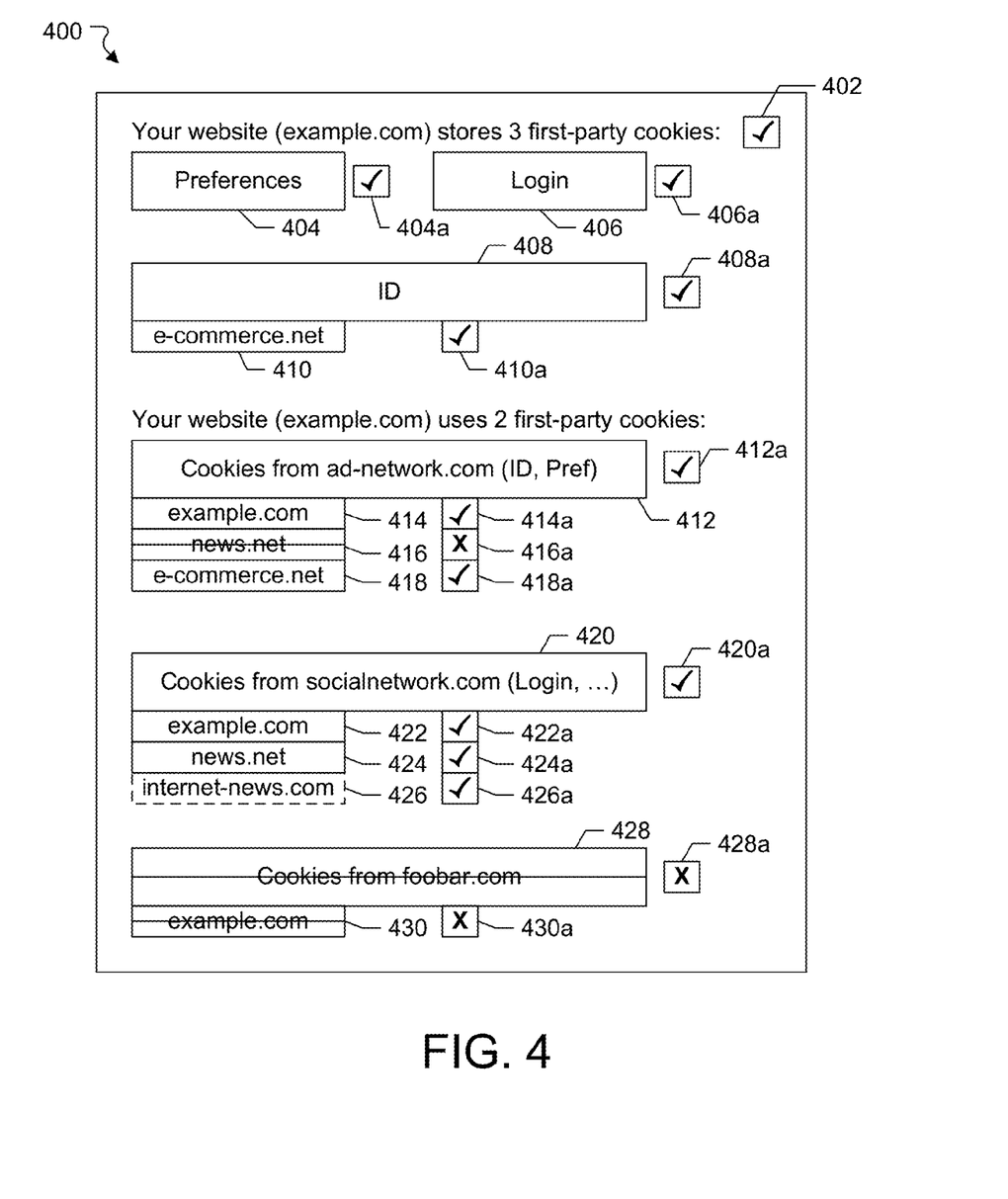
FIG. 4 illustrates another example of a graphical interface which differentiates display between domains serving cookies in a first-party context or a third-party context.

Graphical representation module 208 provides for a graphical representation of the one or more domains, based on the determination for each of the one or more domains. The graphical representation differentiates display between the first-party context or the third-party. The graphical representation can also provide interfaces for enabling or disabling cookies served by the identified domains. FIGS. 3 and 4 illustrate different examples of such a graphical representation.

FIG. 3 illustrates an example of a graphical interface which differentiates display between domains serving cookies in a first-party context or a third-party context. In the example of FIG. 3, interface 300 includes nodes 302, 304, 306, 308 and 310 (hereinafter nodes 302-310). Each of nodes 302-310 correspond to a domain which serves at least one cookie to a website. Nodes 302-310 are interconnected by edges 312, 314, 316 and 318 (hereinafter edges 312-318).

Node 304 corresponds to the domain website1.com, which can host one or more websites (e.g., with http://www.website1.com/index.html being one website). One or more domains (e.g., first-party or third-party domains) can serve cookies to a website hosted by domain website1.com. In the example of FIG. 3, cookies can be served by the following domains: website1.com (corresponding to node 304, a primary node), foo1.com (corresponding to node 302, a secondary node), foo2.com (corresponding to node 306, a secondary node) and bar.com (corresponding to node 308, a secondary node).

As such, interface 300 displays a primary node 304 corresponding to a domain (e.g., website1.com) which serves at least one cookie within the first-party context, and multiple secondary nodes 304-308 corresponding to domains (e.g., foo1.com, foo2.com and bar.com) which serve at least one cookie within the third-party context. Primary node 304 is connected via edges 312-316 to secondary nodes 304-308.

Interface 300 provides for a user to enable or disable cookies for a website hosted by website1.com, on a domain-by-domain basis. For example, node 304 corresponds to a first-party domain relative to a website hosted by website1.com. A user can enable or disable cookies served by the first-party domain of node 304 via interface component 304a.

More specifically, interface 300 displays a checkmark to signify that cookies are enabled, and an "X" to signify that cookies are disabled. The "check" or "X" can be toggled via user input (e.g., via mouseclick, touch input, or other user input). As such, the user can place a checkmark within interface component 304a (e.g., via mouseclick, touch input or other user input) to enable cookies from the domain website1.com, and can place an "X" within interface component 304a (e.g., via mouseclick, touch input or other user input) to disable cookies from website1.com.

In the example of FIG. 3, interface component 304a displays a checkmark for node 304, indicating that the domain website1.com is currently enabled to serve cookies for a website hosted by website1.com. It should further be noted that each of nodes 302-310 include a corresponding interface component 302a-310a, each of which is used to enable or disable first-party cookies for websites hosted by the respective domain (e.g., by the domains corresponding to nodes 302-310).

The user of interface 300 can also enable or disable cookies served by third-party domains, or domains which serve at least one cookie within a third-party context relative to a website hosted by website1.com. Each of domains foo1.com (node 302), foo2.com (node 306) and bar.com (node 308) serve at least one cookie to a website hosted by website1.com. Thus, domains, nodes 302, 306 and 308 correspond to third-party domains for that website.

A user can enable or disable cookies served by these domains via user input (e.g., mouseclick, touch input) at any of respective edges 312, 314 or 316. Edges in solid line can indicate that cookies are enabled for the respective third-party domains, and edges in dotted line can indicated that cookies are disabled for the respective third-party domains. In the example of FIG. 3, edges 312 and 314 are in solid line, and indicate that cookies for a website hosted on website1.com are enabled for respective third-party domains foo1.com and foo2.com. On the other hand, edge 316 is in dotted line, and indicates that cookies for a website hosted on website1.com are disabled for respective third-party domain bar.com.

Alternatively, or in addition, each of edges 312-316 can include an interface component (e.g., 312a and 316a) for toggling between enabling and disabling cookies. A user can select such an edge (e.g., via mouseclick or touch input) to either disable or enable the servicing of cookies from the respective third-party domain. In example aspects, the interface component (e.g., 312a, 316a) is only made visible upon a hover action by a user, so as to reduce the number of displayed interfaces when the user is not interacting with an edge of interface 300. Thus, edges 312-316 are displayed as lines (e.g., dotted or solid) without the additional interface component, until a user interacts (e.g., via a hover action) with the edge.

In the example of FIG. 3, a checkmark appears within interface component 312a upon a hover action, confirming to a user to that third-party cookies are from foo1.com are currently enabled. If the user clicks the checkmark, interface 312a can change to an "X" and line 312 can change to a dotted line, corresponding to the disabling of cookies. In addition, an "X" can appear within interface component 316a upon a hover action, confirming to a user to that third-party cookies are from foo1.com are currently disabled. If the user clicks the checkmark, interface 316a can change to a checkmark and line 316 can change to a solid line, corresponding to the enabling of cookies.

FIG. 3 further illustrates node 310, which connects to node 306 via edge 318. Node 310 is an example of another domain (e.g., website2.com) which can host a website having cookies associated therewith. At least one cookie is served from a first-party domain (e.g., from the domain website2.com itself) and interface 310a can be used to disable or enable this at least one cookie. In addition, at least one cookie is served from a third-party domain (e.g., from foo2.com), and an interface associated with edge 318 (e.g., similar to the interface of 316a) can be used to disable or enable this at least one cookie.

It should be noted that user input provided via interface 300 (e.g., for disabling or enabling cookies) can be stored in association with a user profile. In this manner, it is possible for the enabling or disabling of cookies to be synchronized across multiple devices of a user and/or across different browsers/applications. For example, if cookies for a particular advertiser are blocked on one device of a user, all devices for that user may block cookies from that advertiser.

FIG. 4 illustrates another example of a graphical interface which differentiates display between domains serving cookies in a first-party context or a third-party context. Interface 400 displays the domains serving cookie(s) for a website as separate entries in list form. In the example of FIG. 4, a website is hosted on the domain of example.com.

Interface 400 includes 3 first-party cookies associated with access to the hosted website. These 3 first-party cookie are preferences cookie 404, login cookie 406 and identification cookie 408. For example, preferences cookie 404 stores user preferences when accessing a website hosted by example-.com, login cookie 406 stores login information when a user accesses the website, and identification cookie 408 stores information corresponding to the identification of the user (e.g., full user name, address, telephone number, etc.) when accessing the website.

Interface 400 also allows a user to enable or disable the 3 first-party cookies. In this regard, interface component 402a displays a checkmark, indicating that all 3 of the first-party cookies are enabled. A user can toggle the enabling or disabling of all first-party cookies via interface component 402a (e.g., via "X" or checkmark). Alternatively, or in addition, the user can toggle individual ones of the first-party cookies via interface components 404a, 406a and 408a.

Identification cookie 408 further includes an entry 410. Entry 410 indicates that another website (e.g., hosted by e-commerce.net) uses the identification cookie 408 served by the domain example.com. In this example, the cookie is used within a third-party context for the website hosted by e-commerce.net. Interface component 410a can be used to toggle between enabling and disabling third-party cookies from example.com to the website hosted on e-commerce.net.

In addition, interface 300 identifies 3 third-party domains which serve cookies to a website hosted by example.com. In particular, cookies from ad-network.com 412 can include an identification and a preferences cookie, cookies from social-network.com 420 can include a login cookie. Cookies are also served from foobar.com 428. A user can disable or enable the serving of these third-party cookies to a website hosted on example.com, for example, via interface components 412a, 420a and 428a, respectively.

Interface 400 displays entries 414, 416 and 418 in association with cookies from ad-network.com 412. Entry 414 corresponds to a website hosted by example.com (e.g., as a redundant entry), entry 416 corresponds to a website hosted by news.net, and entry 418 corresponds to a website hosted by e-commerce.net. Each of entries 414-418 indicates that the respective website uses cookies served by the domain ad-network.com, within a third-party context. Each of interface components 414a, 416a and 418a can be used to toggle between enabling and disabling third-party cookies from ad-network.com to these respective websites.

Interface 400 also displays entries 422, 424 and 426 in association with cookies from socialnetwork.com 420. Entry 422 corresponds to a website hosted by example.com (e.g., as a redundant entry), entry 424 corresponds to a website hosted by news.net, and entry 426 corresponds to a website hosted by internet-news.com. Each of entries 422-426 indicates that the respective website uses cookies served by the domain social-network.com, within a third-party context. Each of interface components 422a, 424a and 426a can be used to toggle between enabling and disabling third-party cookies from socialnetwork.com to these respective websites. In example aspects, entry 426 appears with dotted line, to indicate that internet-news.com is a website not yet visited by the user, but is otherwise popular and often uses socialnetwork.com as a third party.

Interface 400 displays entry 430 in association with cookies from foobar.com 428. Entry 430 corresponds to a website hosted by example.com (e.g., as a redundant entry). In the example of FIG. 4, these cookies are disabled, as seen by interface component 428a.

It should be noted that user input provided via interface 400 (e.g., for disabling or enabling cookies) can be stored in association with a user profile. In this manner, it is possible for the enabling or disabling of cookies to be synchronized across multiple devices of a user and/or across different browsers/applications. As such, if cookies for a particular advertiser are blocked on one device of a user, all devices for that user may block cookies from that advertiser.

Figure 5:
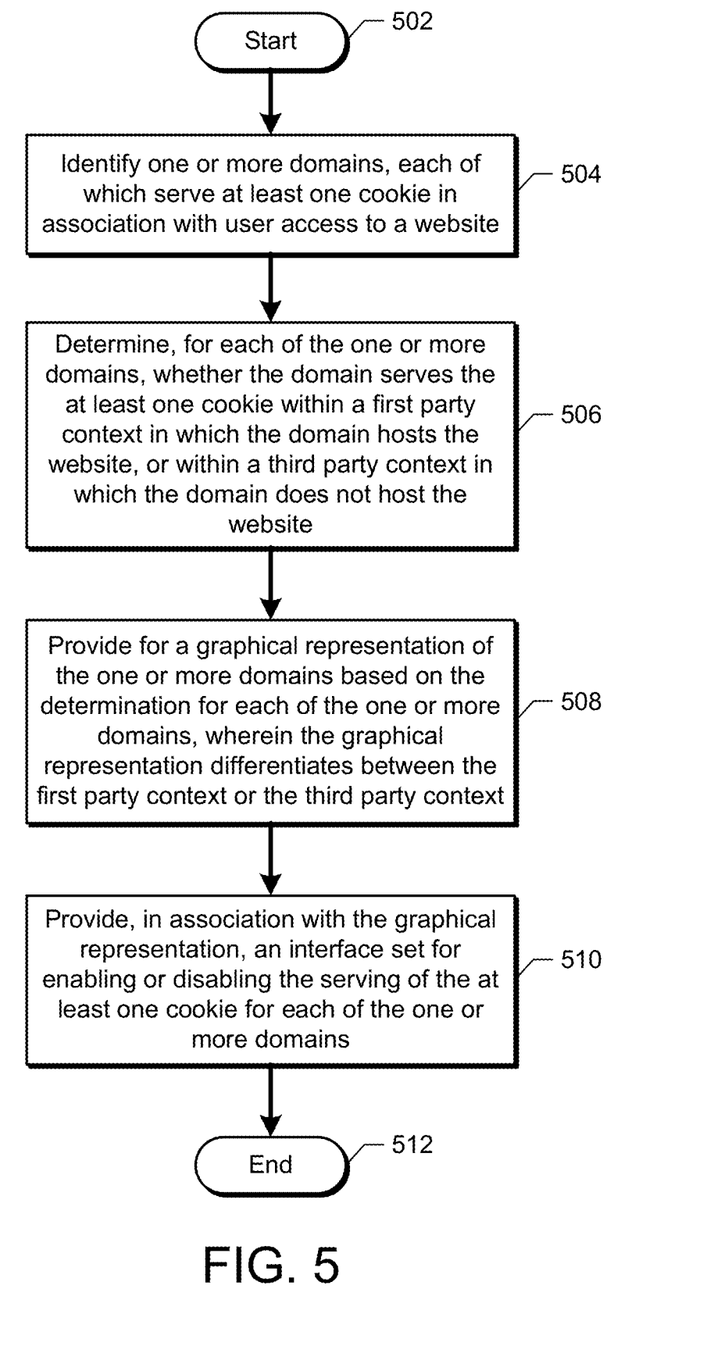
FIG. 5 illustrates an example process by which cookies are enabled for a website.

FIG. 5 illustrates an example process by which cookies are enabled for a website. Following start block 502, one or more domains are identified at step 504. Each of the one or more domains serve at least one cookie in association with user access to a website. Each of the one or more domains can serve the at least one cookie by at least one of submitting a prior cookie or storing a new cookie.

At step 506, for each of the one or more domains, a determination is made whether the domain serves the at least one cookie within a first-party context in which the domain hosts to the website, or within a third-party context in which the domain does not host the website. At step 508, a graphical representation of the one or more domains is provided based on the determination for each of the one or more domains. The graphical representation differentiates between the first-party context or the third-party context. At step 510, in association with the graphical representation, an interface set is provided for enabling or disabling the serving of the at least one cookie for each of the one or more domains.

The graphical representation can display a domain which serves the at least one cookie within the first-party context as a primary node, and a domain which serves the at least one cookie within the third-party context as a secondary node connected via an edge to the primary node. The interface set can include an interface, at each of the primary or secondary nodes, for enabling or disabling first-party cookies. The interface set can include an interface, at each of the edges, for enabling or disabling third-party cookies.

The graphical representation can display the one or more domains as separate entries within a list. The interface set can include an interface at each entry for enabling or disabling cookies. The graphical representation can further display, for at least one entry, an additional website to which the domain corresponding to the at least one entry serves a cookie. The interface set can include an interface for enabling or disabling cookies served to the additional website, from the domain corresponding to the least one entry. The process then ends at end block 512.

Although certain examples provided herein can describe a user's information being stored in memory, the user can delete the user information from memory and/or specify not to store the user information in memory. In example aspects, the user can adjust appropriate privacy settings to selectively limit the types of user information stored in memory, or select the memory in which the user information is stored (e.g., locally on the user's device as opposed to remotely on a server). In example aspects, the user information does not include and/or share the specific identification of the user (e.g., the user's name) unless otherwise specifically provided or directed by the user.

Figure 6:
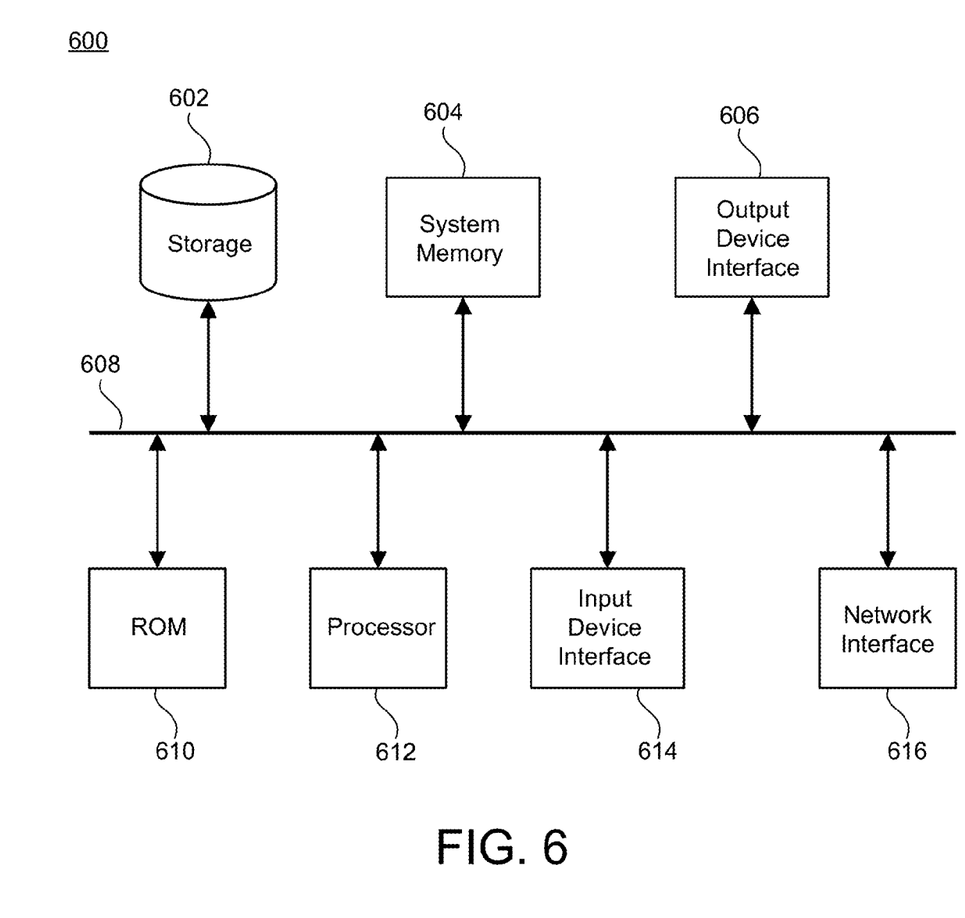
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, or ROM 610. For example, the various memory units include instructions for enabling cookies for a website in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a local area network ("LAN"), a wide area network ("WAN"), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of enabling cookies for a website, the method comprising:
    identifying one or more domains, each of which serve at least one cookie in association with user access to a website;
    determining, for each of the one or more domains, whether the domain serves the at least one cookie within a first-party context in which the domain hosts the website, or within a third-party context in which the domain does not host the website;
    providing for a graphical representation of the one or more domains based on the determination for each of the one or more domains, wherein the graphical representation differentiates between the first-party context or the third-party context, the graphical representation displaying, for at least one domain, an additional website to which the domain serves a cookie; and
    providing, in association with the graphical representation, an interface set for enabling or disabling the serving of the at least one cookie for each of the one or more domains.

2. The method of claim 1, wherein the graphical representation displays a domain which serves the at least one cookie within the first-party context as a primary node, and a domain which serves the at least one cookie within the third-party context as a secondary node connected via an edge to the primary node.

3. The method of claim 2, wherein the interface set comprises an interface, at each of the primary or secondary nodes, for enabling or disabling first-party cookies.

4. The method of claim 2, wherein the interface set comprises an interface, at each of the edges, for enabling or disabling third-party cookies.

5. The method of claim 1, wherein the graphical representation displays the one or more domains as separate entries within a list.

6. The method of claim 5, wherein the interface set comprises an interface at each entry for enabling or disabling cookies.

7. The method of claim 5, wherein the graphical representation further displays the additional website for at least one entry of the list, wherein the domain corresponds to the at least one entry.

8. The method of claim 7, wherein the interface set includes an interface for enabling or disabling cookies served to the additional website, from the domain corresponding to the at least one entry.

9. The method of claim 1, wherein each of the one or more domains serve the at least one cookie by at least one of submitting a prior cookie or storing a new cookie.

10. A system for enabling cookies for a website, the system comprising:
   one or more processors; and
   a machine-readable medium comprising instructions stored therein, which when executed by the processors, cause the processors to perform operations comprising:
      identifying one or more domains, each of which serve at least one cookie in association with user access to a website, wherein each of the one or more domains serve the at least one cookie by at least one of submitting a prior cookie or storing a new cookie;
      determining, for each of the one or more domains, whether the domain serves the at least one cookie within a first-party context in which the domain hosts the website, or within a third-party context in which the domain does not host the website;
      providing for a graphical representation of the one or more domains based on the determination for each of the one or more domains, wherein the graphical representation differentiates between the first-party context or the third-party context, the graphical representation displaying, for at least one domain, an additional website to which the domain serves a cookie; and
      providing, in association with the graphical representation, an interface set for enabling or disabling the serving of the at least one cookie for each of the one or more domains.

11. The system of claim 10, wherein the graphical representation displays a domain which serves the at least one cookie within the first-party context as a primary node, and a domain which serves the at least one cookie within the third-party context as a secondary node connected via an edge to the primary node.

12. The system of claim 11, wherein the interface set comprises an interface, at each of the primary or secondary nodes, for enabling or disabling first-party cookies.

13. The system of claim 11, wherein the interface set comprises an interface, at each of the edges, for enabling or disabling third-party cookies.

14. The system of claim 10, wherein the graphical representation displays the one or more domains as separate entries within a list.

15. The system of claim 14, wherein the interface set comprises an interface at each entry for enabling or disabling cookies.

16. The system of claim 14, wherein the graphical representation further displays the additional website for at least one entry of the list, wherein the domain corresponds to the at least one entry.

17. The system of claim 16, wherein the interface set includes an interface for enabling or disabling cookies served to the additional website, from the domain corresponding to the at least one entry.

18. A machine-readable medium comprising instructions stored therein, which when executed by a system, cause the system to perform operations comprising:
   determining that a first domain serves at least one cookie in association with access to a website, within a first-party context in which the first domain hosts the website;
   determining that a second domain serves at least one cookie in association with access to the website, within a third-party context in which the second domain does not host the website;
   providing for a graphical representation of the first and second domains, wherein the graphical representation indicates the first-party context for the first domain and indicates the third-party context for the second domain, the graphical representation displaying, for at least one domain, an additional website to which the domain serves a cookie; and
   providing, in association with the graphical representation, an interface set for enabling or disabling the serving of the at least one cookie for each of the first and second domains.

19. The machine-readable medium of claim 18, wherein the graphical representation displays the first domain as a primary node, and the second domain as a secondary node connected via an edge to the primary node.

20. The machine-readable medium of claim 18, wherein the graphical representation displays the first and second domains as separate entries within a list.

* * * * *